United States Patent
Ruuskanen et al.

(10) Patent No.: US 6,208,641 B1
(45) Date of Patent: Mar. 27, 2001

(54) SWITCH WITH ONE-BIT RESOLUTION

(75) Inventors: Markku Ruuskanen, Porvoo; Tapio Kallioniemi, Vantaa, both of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/029,519

(22) PCT Filed: Sep. 4, 1996

(86) PCT No.: PCT/FI96/00473

§ 371 Date: Mar. 5, 1998

§ 102(e) Date: Mar. 5, 1998

(87) PCT Pub. No.: WO97/09839

PCT Pub. Date: Mar. 13, 1997

(30) Foreign Application Priority Data

Sep. 5, 1995 (FI) .................................................. 954158

(51) Int. Cl.[7] .................................................. H04L 12/50
(52) U.S. Cl. .......................... 370/375; 370/376; 370/377; 370/378
(58) Field of Search .................................. 370/368, 369, 370/371, 372, 375, 376, 377, 378, 379, 381, 382, 383, 412

(56) References Cited

U.S. PATENT DOCUMENTS

| | | |
|---|---|---|
| 4,718,058 | 1/1988 | Van Vugt . |
| 5,007,049 | 4/1991 | Ohtsuka .............................. 370/269 |
| 5,311,517 | 5/1994 | Senoo ................................. 370/428 |
| 5,317,572 | 5/1994 | Satoh .................................. 370/509 |
| 5,390,184 | 2/1995 | Morris ................................. 370/353 |
| 5,479,398 | 12/1995 | Cyr ..................................... 370/537 |
| 5,841,771 | 11/1998 | Irwin et al. .......................... 370/360 |
| 5,862,136 | 1/1999 | Irwin .................................. 370/395 |
| 5,905,735 | 5/1999 | Wille .................................. 370/524 |
| 6,009,078 | 12/1999 | Sato ................................... 370/232 |

FOREIGN PATENT DOCUMENTS

| | | |
|---|---|---|
| 418 475 | 3/1991 | (EP) . |
| 483 516 | 5/1992 | (EP) . |
| 93/1656 | 8/1993 | (WO) . |

*Primary Examiner*—Wellington Chin
*Assistant Examiner*—Brenda H. Pham
(74) *Attorney, Agent, or Firm*—Pillsbury Winthrop LLP

(57) ABSTRACT

The invention relates to implementing switching in a switch in a digital telecommunications system. N incoming signals are introduced to the switch, each comprising successive one-bit time slots that form successive frames each comprising K time slots. The contents of the time slots for the incoming signals are stored in a memory at a memory location determined by a write address in such a way that a word having the width of at least one bit is stored at one memory location. One word at a time is read out from the memory, wherefrom the desired bit is selected for the outbound signal from the switch. To optimize the size and power consumption of the switch, the incoming signals are distributed to X multiplexers ($A_1 \ldots A_x$), each interleaving the incoming signals thereto into a single serial output signal (IN1 . . . INX), and writing into memory is carried out by writing the contents of the time slots of the output signals into the same memory location having a width of at least X bits, the memory location changing from one time slot of the output signals of the multiplexers to another.

9 Claims, 3 Drawing Sheets

Figure 1:
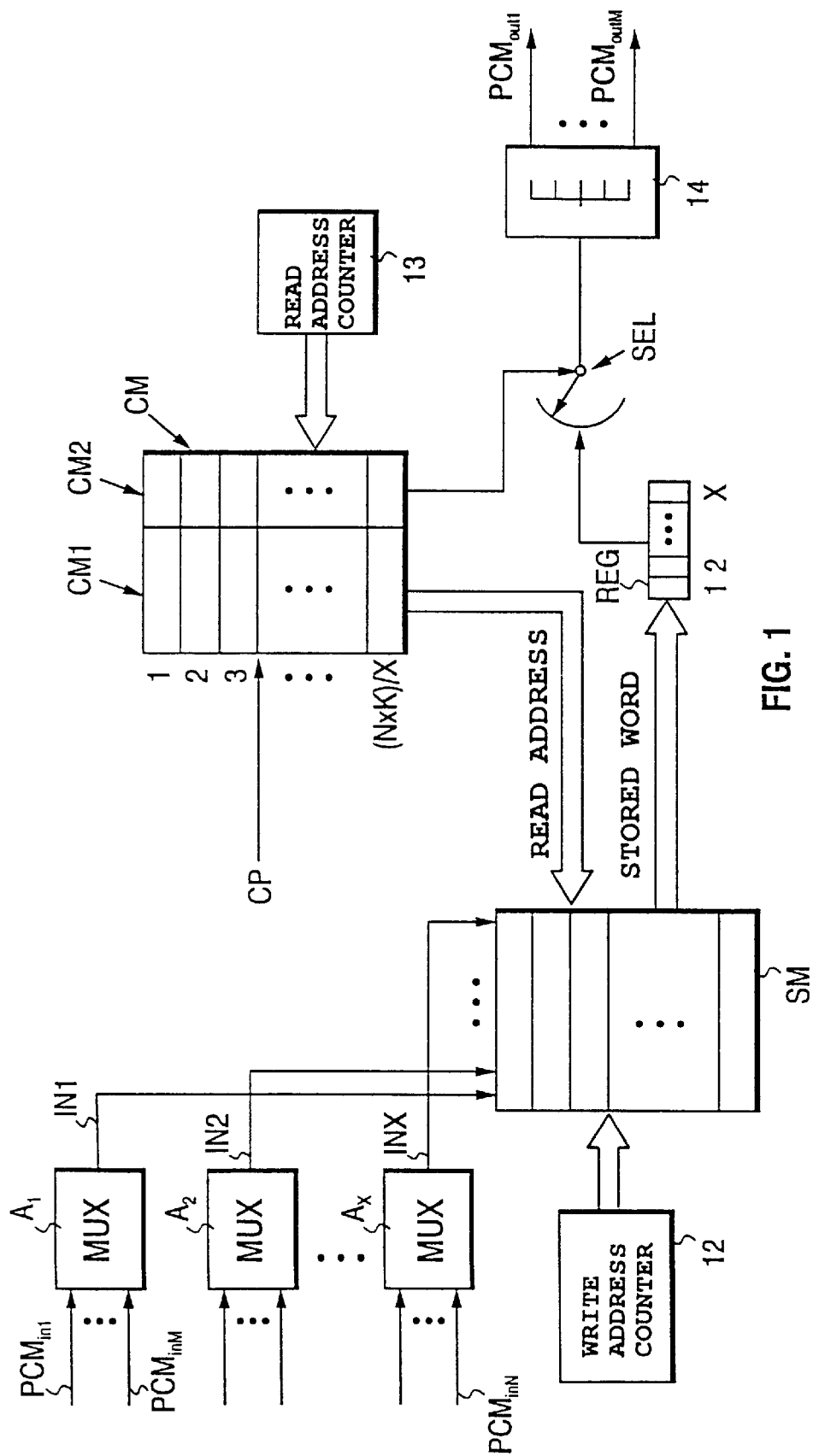

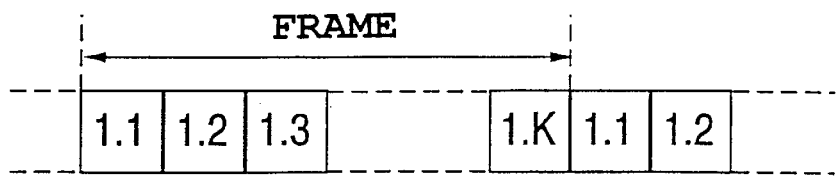
FIG. 2a
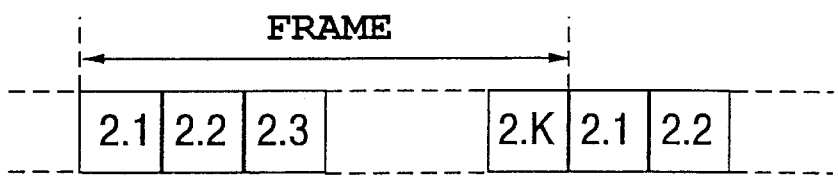
FIG. 2b
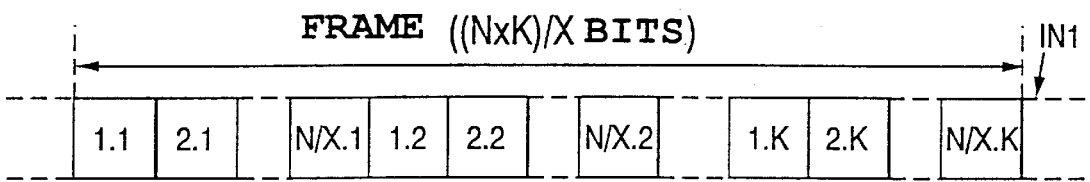
FIG. 2c
FIG. 3

SWITCH WITH ONE-BIT RESOLUTION

This application is the national phase of international application PCT/FI96/00473 filed Sep. 4, 1996 which designated the U.S.

The present invention relates to a method in accordance with the preamble of the appended claim 1 and a switch in accordance with the preamble of the appended claim 5 for implementing switching with one bit resolution.

In digital transmission systems, data is transmitted in a successive stream of bits or symbols in time slots in which a predetermined number of bits, typically eight bits, are transmitted. In conventional PCM systems, these bits in one time slot are all reserved for one channel. In the European 2048 kbit/s basic multiplex system (in which the frame length is 32 time slots, i.e. 256 bits), altogether 30 speech channels each having a transmission rate of 64 kbit/s can be sent in this way. (The corresponding United States system has 24 channels, the rate being 1544 kbit/s).

Today, however, sophisticated speech encoding methods are available for improving the transmission capacity. The capacity of the above 2048 kbit/s basic system can be enlarged to 60 or 120 speech channels, for example. In such a case, the information in the speech channels has to be coded in a codec.

On account of such encoding methods, one speech channel thus only occupies some of the bits in the time slot, e.g. four or two bits out of eight. Codecs are also available wherewith a band of 7 kHz, for instance, can be transmitted by employing 6, 7 or 8 bits per time slot, i.e. by taking up 48, 56 or 64 kbit/s of the capacity of the basic multiplex system. Such approaches allow sub-channels, such as data channels, to be packed into one time slot, since less than 8 bits per time slot are needed to transmit the actual channel.

As a result of the development described above, a need has arisen to switch information to be transferred with one bit resolution instead of switching byte by byte (i.e. one word at a time). Such switches operating with one bit resolution have usually been implemented by using switching memory circuits having a width of one bit. The problem attending such an approach, however, is that the number of memory circuits increases quadratically in relation to the number of channels. Consequently, the memory circuits in practice pose a limitation on the capacity of the switch, since the physical size and also the power consumption of the switch rapidly increases to be impractically high when the number of channels increases.

This drawback also attends the switch disclosed in PCT application WO 93/16568. This publication discloses a switch switching on bit level and serving as an aid to a switch operating on byte level. In this switch, the switching has two phases in such a way that first the desired bytes are selected and thereafter the desired bits are selected from these bytes. The incoming bytes (words) to the auxiliary switch are first written into speech memories having a width of one byte, their number being equal to the number of bits in a byte. Under the control of a first control memory block, one byte is selected from each speech memory, and this byte is stored in a corresponding byte memory. Hence the number of byte memories is equal to the number of speech memories. Thereafter, under the control of a second control memory block, one bit is selected from each byte memory for storage in a bit memory. In this way, a new PCM word is formed as the output of said switch.

The drawback attending the above solution is, however, still the fact that a relatively large number of memory circuits are needed, since the number of copies of each incoming byte must equal the number of bits in the byte. As a result, also the physical size and power consumption of the switch are still relatively high. Furthermore, this solution is intended to serve as a small auxiliary switch alongside a switch performing byte-oriented switching, and is not as such intended as an independent (high-capacity) switch.

It is an object of the present invention to provide an improvement in an independent switch with one bit resolution so as to afford considerably more efficient memory circuit utilization. This object is achieved with the method in accordance with the invention, which is characterized by what is disclosed in the characterizing portion of the appended claim 1. The switch in accordance with the invention is characterized by what is disclosed in the characterizing portion of the appended claim 5.

The idea of the invention is to implement a switch in the manner described hereinbelow. Input links of the switch are grouped to multiplexers which interleave the input signals of the switch into a smaller number of higher-rate serial signals. These signals are stored by writing the bits of the serial signals into the same memory location having a width of several bits. This is preferably carried out in such a way that bits corresponding to each other (i.e. bits occurring in the same write time slot) are stored at one memory location. In a preferred embodiment, a memory location corresponds in width to the number of multiplexers. Reading out from the memory is carried out in two steps, first selecting the correct byte from the memory and thereafter selecting the desired bit from this byte.

On account of the solution in accordance with the invention, it is possible to pack data very effectively into the memory of the switch. In other words, the switching memory can be implemented with a minimum of memory circuits, thus enabling low power consumption and a small physical size for the switch.

Figure 4:
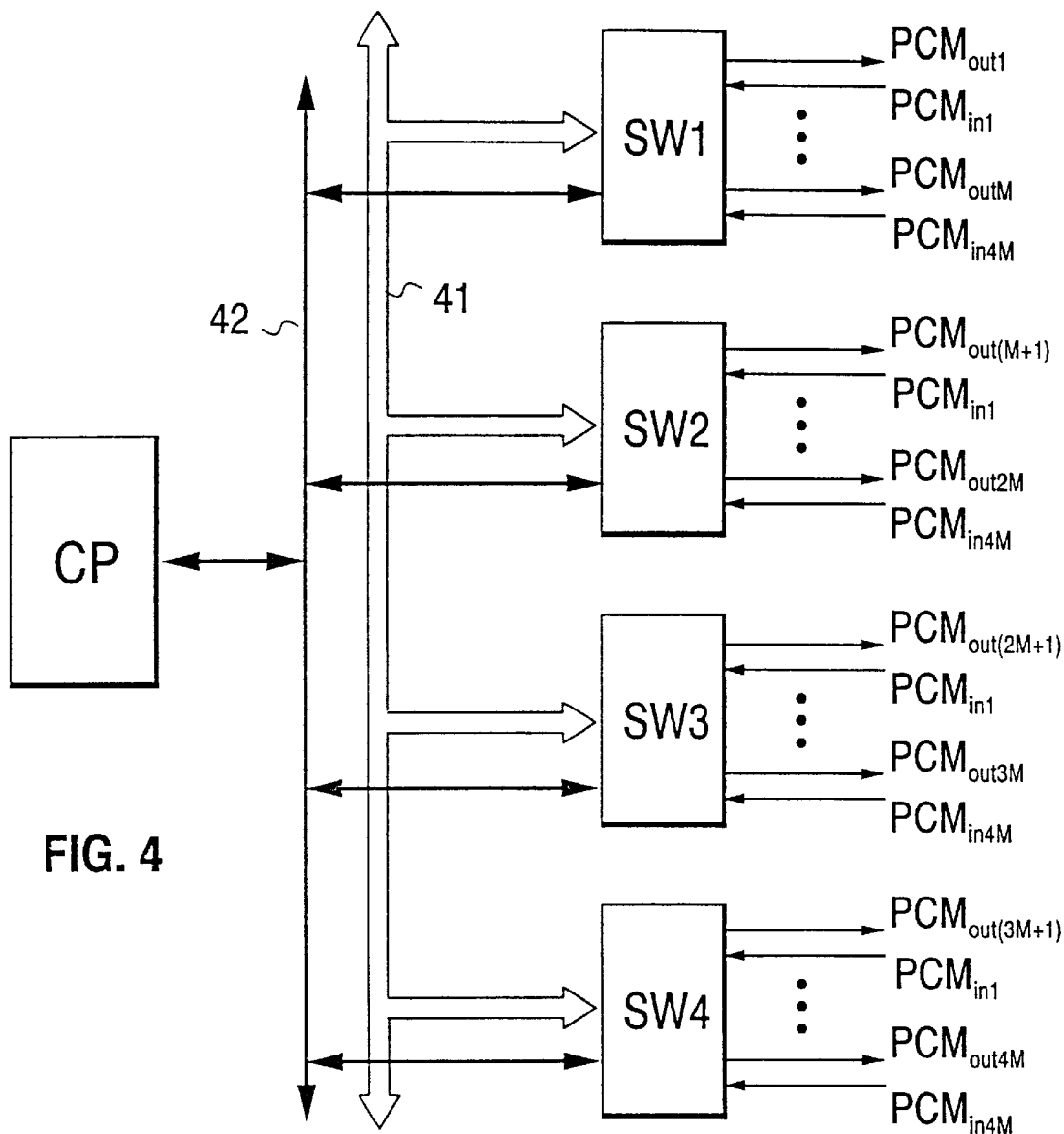

In the following the invention and its preferred embodiments will be described in greater detail with reference to examples in accordance with the accompanying drawings, in which FIG. 1 shows a switch in accordance with the present invention, FIGS. 2a and 2b depict two incoming signals to the switch shown in FIG. 1, FIG. 2c illustrates a signal to be stored in the switch shown in FIG. 1, FIG. 3 illustrates storing in a switching memory shown in FIG. 1, and FIG. 4 illustrates a more extensive switch composed of four individual switches.

FIG. 1 shows a switch in accordance with the present invention with one bit resolution. In this exemplary case, N incoming serial time-division connections or links denoted by references $PCM_{in1}$ . . . $PCM_{inN}$ are connected to the switch. In each of these incoming signals, the frame length is K bits, and hence an individual signal has a maximum of K channels in accordance with the above.

An individual incoming signal may be for instance the above 2048 kbit/s signal in accordance with the ITU-T (formerly CCITT) recommendations G.703 and G.704 or a signal having a rate that is a multiple of this basic rate. If a 2048 kbit/s signal is involved, the frame may comprise for example only one channel having a width of 256 bits or 256 channels having a width of one bit, or a combination of these two extreme cases. In general outline, a frame of K bits for an individual incoming signal may comprise 1 . . . K channels each of which has a width of n bits, n being an integer smaller than or equal to K. In the following, a rate equal to twice the basic rate will be employed by way of example, wherein each incoming line constitutes a 4096 kbit/s (K=512) serial connection, 32 of such incoming signals being provided (N=32), and hence there is a total of K×N=512×32=16384 incoming "one-bit channels" to the switch, each having a capacity of 8 kbit/s. All channels are thus formed from such one-bit channels or multiples thereof. Since, how-ever, the switch of the invention performs switching of all channels one single-bit "sub-channel" at a time, this one-bit channel is called a basic channel in this context (even though it forms only part of a higher-rate channel).

The incoming lines are divided to multiplexers $A_1 \ldots A_x$, X multiplexers being provided. Hence, there are M=N/X similar signals to each multiplexer. Thus the ratio of incoming signals and multiplexers is (preferably) such that the signals can be evenly divided between the multiplexers. Each multiplexer interleaves the incoming signals into serial form, and hence the bit rate at the out-put of each multiplexer is N/X times the bit rate of the incoming signals. The number X may be e.g. 4, 8 or 16; in the following a case where X=4 is exemplified.

FIGS. 2a and 2b illustrate a first and second incoming signal for the first multiplexer ($A_1$), i.e. FIG. 2a shows an incoming signal from link $PCM_{in1}$ and FIG. 2b shows an incoming signal from link $PCM_{in2}$. Each bit is denoted by x.y, where the number x in front of the full stop indicates the consecutive number of the incoming signal or link to the multiplexer, and the number y after the full stop indicates the sequence number of the bit within the signal frame structure ($1 \leq y \leq K$).

A signal IN1 of the kind shown in FIG. 2c is generated at the output of the first multiplexer ($A_1$), including initially the first bit from each incoming signal, thereafter the second bit from each incoming signal etc., and lastly the K:th bit from each incoming signal (N/X of incoming signals being provided). Correspondingly, each multiplexer interleaves the incoming signals into a single serial output signal. Hence, there is a total of X such output signals, denoted by IN1 . . . INX in FIG. 1.

The output signals of the multiplexers are stored in a switching memory SM, having a total of (N×K)/X memory locations each having a width of X bits. FIG. 3 illustrates storing in the switching memory. In each time slot for the incoming signals (i.e. of output signals of the multiplexers), writing is carried out into the same memory location having a width of X bits in such a way that in the first time slot of the frame, the data is written into memory location 1, in the second time slot of the frame into memory location 2, etc., and in the last time slot of the frame into memory location (N×K)/X. (It should be noted that in this case, the time slot corresponds to one basic channel.) Hence, the contents of the output signal frame of the first multiplexer ($A_1$) are stored in bit positions 1, the contents of the output signal frame of the second multiplexer ($A_2$) are stored in bit positions 2, etc., and the contents of the frame for the last multiplexer ($A_x$) are stored in the last bit position (X) in the memory locations of the switching memory.

The write addresses are generated in a write address counter 12, which increments (in synchronization with the clock signal on the write side) continually from one to (N×K)/X (4096 in this exemplary case). The write operation is carried out cyclically with addresses generated by counter 12.

There is one outgoing multiplexed 8×4M line (i.e., 16 standard 2M PCM signals) from the switch of FIG. 1. One memory location is provided in the control memory CM of the switch for each bit outputted to the line, i.e. there is a total of N×K/X memory locations. The control memory is read in step with a read address counter 13. The counter increments continually from one to N×K/X. Each memory location in the control memory CM is bipartite in such a way that the first part CM1 stores the read addresses of the switching memory SM and the bits of the second part CM2 control a selector SEL. The data stored in the first part of each memory location indicates the storage address in the switching memory of the X-bit word whose bit content (i.e., 8 kbit/s basic rate channel) is to be switched to the relevant output channel.

Hence, a connection between two channels is established when the control memory CM is read cyclically at addresses generated by counter 13, and a read address for the switching memory SM is obtained from the data in the control memory. In the switching memory, writing into the memory constantly alternates with reading out therefrom. As such, the above arrangement is known from byte-oriented switches.

By means of the read address obtained from the first part of the control memory, the contents of the corresponding memory location (in the switching memory) are read into a register REG having a width of X bits. By means of the control word obtained from the second part of the control memory on the other hand, the correct bit of this word which was introduced into the register is selected with a selector SEL. Hence, one word is read out into the register per every outputted bit, and the correct bit is selected from these.

The switching information stored in the control memory is obtained from a processor unit CP (not shown) controlling the equipment, which may have received the information for instance through the signalling network to which the equipment is connected. Since maintenance of the contents of the control memory takes place in a manner known per se and does not relate to the actual inventive idea, it will not be described in greater detail in this context.

Finally, serial connections for the outbound direction are formed from serial data obtained from the selector SEL in a manner known per se in a demultiplexer unit 14. Since the forming of the outgoing connections is not within the scope of the actual inventive idea, it will not be described in greater detail in this context.

The number of outgoing connections M of the basic block of the above-described switch equals N/X, in other words, equals the number of connections multiplexed by one multiplexer. The number of outgoing connections can be replicated by replicating parts SM, CM, REG and SEL in FIG. 1. In that case, if for example in accordance with the above preferred embodiment a 64 PCM×64 PCM switching matrix (PCM denotes a standard 2M PCM signal) is desired, four parallel switching memory-control memory-register-selector combinations are needed, each switching one outgoing 8×4M multiplexed line. During the write phase, the four-bit 8×4M output signal from multiplexers $A_1-A_4$ is written simultaneously into each of the four switching memories under the control of a common write address counter. During the read phase, the word corresponding to the desired switching stored in the switching memory corresponding to each multiplexed 8×4M line is stored in the register corresponding to the pertinent line. The selector corresponding to the line selects, under the control of the control memory, the bit corresponding to the desired connection from this register. This enables switching of the desired connection from the four incoming multiplexed 8×4M lines to the four outgoing 8×4M lines. If the read rate of the switching memory SM can be increased to be four-fold in relation to the write rate, the switching memory need not be replicated, but all four control memory-register-selector combinations may use a switching memory in common.

In accordance with the invention, incoming PCM connections can easily be added to the combination described above without adding to the actual switching equipment. The above-described 64 PCM×64 PCM switch, for instance, can easily be expanded into a 256 PCM×64 PCM switch merely by employing a four-fold number of input multiplexers and by having a memory width of sixteen bits in the switching memory (memories).

For example a 256 PCM×256 PCM matrix is correspondingly achieved in the manner shown in FIG. 4 by employing four 256 PCM×64 PCM switches SW1 . . . SW4 as described above in parallel. All switches are controlled by a control processor CP through a control bus 42. The control processor also distributes the necessary clock signals to all switches. Each switch (SW) interleaves incoming serial signals $PCM_{in1}$ . . . $PCM_{in4M}$ to a common data bus 42, which in this case has a width of 4X bits, and some (in this case, a fourth) of the signals are outputted from each switch. In each switch, the contents of the data bus are written into a switching memory, preferably in this case having a width equal to the number of signals (4X) on the data bus 42. In each basic switch, the word corresponding to the desired channel is read out from the switching memory, and the selected bit is chosen from this word by a selector. The above-described more extensive switch can naturally also be implemented with one physical unit.

In each case, the number of serial signals (PCM) to be switched and the rate of the control/switching memory employed determine how many copies of the switching memory are to be taken.

Even though the invention has been described in the above with reference to the examples in accordance with the accompanying drawings, it is obvious that the invention is not restricted thereto but can be modified within the scope of the inventive idea disclosed in the foregoing and in the attached claims.

What is claimed is:

1. A method for implementing switching in a switch in a digital telecommunications system, in accordance with which method N incoming signals are input to the switch, each comprising successive one-bit time slots that form successive frames, each frame comprising K time slots, the contents of the time slots for the incoming signals are stored in a memory (SM) at a memory location determined by a write address in such a way that a word having the width of at least one bit is stored at one memory location, one word at a time is read out from the memory (SM), wherefrom the desired bit is selected for the outbound signal from the switch, characterized in that the incoming signals are distributed to X multiplexers ($A_1$ . . . $A_x$), each interleaving the incoming signals thereto into a single serial output signal (IN1 . . . INX), and writing into memory is carried out by writing the contents of the time slots of the output signals into the same memory location having a width of at least X bits, the memory location changing from one time slot of the output signals of the multiplexers to another.

2. A method as claimed in claim 1, characterized in that the memory (SM) employs memory locations having the exact width of X bits.

3. A method as claimed in claim 1, characterized in that a total of (N×K)/X memory locations is employed in the memory (SM).

4. A method as claimed in claim 1, characterized in that when the capacity of an existing switch is increased, the number of multiplexers and the memory width is increased, maintaining the above-stated dependency.

5. A switch for a digital telecommunications system for implementing switching with one bit resolution, said switch comprising input connections for N incoming signals, each comprising successive one-bit time slots forming successive frames each comprising K time slots, a memory (SM) for storing the contents of the time lots for incoming signals at a memory location determined by a write address in such a way that a word having a length of several time slots is stored at one memory location, means (CM) for reading out one selected word at a time from said memory, and means (REG, SEL) for selecting a given bit from the word read out, characterized in that the switch further comprises X multiplexers ($A_1$ . . . $A_x$) to which the incoming signals are connected in such a way that some of the signals arrive at each multiplexer, for interleaving the signals introduced to each multiplexer into a single serial output signal, and memory locations of a width of at least X bits in said memory (SM) for storing the contents of corresponding time slots of the output signals of the multiplexers at the same memory location.

6. A switch as claimed in claim 5, characterized in that said memory (SM) has memory locations having the exact width of X bits.

7. A switch as claimed in claim 6, characterized in that said memory (SM) has a total of (N×K)/X memory locations.

8. A switch as claimed in claim 5, characterized in that it is arranged as part of a switch of greater capacity.

9. A switch as claimed in claim 8, characterized in that several switches are arranged in parallel in said switch of greater capacity.

* * * * *